United States Patent [19]

Mambelli

[11] Patent Number: 4,560,020
[45] Date of Patent: Dec. 24, 1985

[54] LIGHT MOTORBIKE WITH TAKEOFF FOR POWERING SEPARATE DEVICES

[75] Inventor: Giancarlo Mambelli, Bologna, Italy

[73] Assignee: Motomec S.r.l., Longiano, Italy

[21] Appl. No.: 560,811

[22] Filed: Dec. 13, 1983

[30] Foreign Application Priority Data

Dec. 17, 1982 [IT] Italy .................................. 5159/82[U]

[51] Int. Cl.[4] ............................................. B62K 15/00
[52] U.S. Cl. .................................. 180/53.1; 180/208; 280/278; 280/287
[58] Field of Search ............... 180/53.1, 208; 280/278, 280/287

[56] References Cited

U.S. PATENT DOCUMENTS

| | | | |
|---|---|---|---|
| 3,282,365 | 1/1966 | McReynolds | 180/208 |
| 3,513,926 | 5/1970 | Paget, Jr. | 280/287 |
| 3,757,882 | 9/1973 | Honja | 280/287 |
| 3,872,943 | 3/1975 | Olson | 180/53.1 |
| 3,872,944 | 3/1975 | Shapiro et al. | 180/208 |
| 4,037,678 | 7/1977 | Braune | 280/287 |
| 4,333,609 | 6/1982 | Backo | 180/53.1 |

*Primary Examiner*—Richard A. Bertsch
*Attorney, Agent, or Firm*—Balogh, Osann, Kramer, Dvorak, Genova & Traub

[57] ABSTRACT

Disclosed herein is a light motorbike, the frame and transmission elements of which are of a special design, that is economical to build, is functional and has minimum space requirements.

Incorporated in the transmission elements is a power takeoff that enables the motorbike to be used also to drive separate devices.

2 Claims, 2 Drawing Figures

LIGHT MOTORBIKE WITH TAKEOFF FOR POWERING SEPARATE DEVICES

BACKGROUND OF THE INVENTION

The invention relates to a light motorbike with takeoff for powering separate devices.

DESCRIPTION OF THE PRIOR ART

The importance is known of always having available, both for caravaning (with campers or towed caravans) and for pleasure craft, certain devices such as generating sets, centrifugal pumps and air compressors, though it must be considered equally important to be provided with a light motorbike for occasional use, with which various needs can be fulfilled.

This means that space has to be found to store, in addition to a motor with which to power the said auxiliary groups, a light motorbike.

Obviously the ideal light motorbike for this purpose has to be cheap and also occupy the minimum possible space.

SUMMARY OF THE INVENTION

The object of the invention is to make available a light motorbike of a special type which not only is of the cheapest possible construction but is highly functional and small in volume to store when not in use.

A further extremely important aspect of the invention is that the transmission elements can be utilized to power any groups with which the campers, towed caravans or boats may be provided.

This object is achieved with the light motorbike according to the invention, comprising:
- an inverted "L" shaped frame, the inside of which is used as a tank and the front tubular part of which, for the connection thereto of the steering and control assembly, can be opened in order to separate the said assembly from the remainder of the motorbike, all the mechanical transmission and electrical cables belonging to the steering and control assembly being equipped with quick fastening/release couplings or connections;
- a rigid casing that contains the transmission and, through a pin, is supported by the rod of the frame, the said casing carrying, cantilevered thereto on one side, the engine and containing, centrally at a point corresponding to where the pin is located, reduction means where the power takeoff is positioned, while on the opposite side to the engine, with respect to the pin, the said casing is provided with a coupling pin for the rear driving wheel, the connection between the frame and the said wheel being effected through one single shock absorber, one extremity of which is fastened to the said frame, and the other to the casing;
- a pair of extractable foot rests that are placed at the bottom of the casing, integral therewith, and also constitute means for resting the casing on the ground at the time the steering and control assembly has been removed, defining an inclination of the upper part of the frame, with respect to the horizontal, at a negative acute angle.

Quite obviously, a light motorbike of this nature is extremely cheap to build, occupies a minimum amount of space, and since the steering and control assembly can be completely detached from the remaining part of the motorbike, the latter can carry out the important task of powering any pre-existing auxiliary devices.

BRIEF DESCRIPTION OF THE DRAWINGS

Further characteristics and advantages of the light motorbike according to the invention will emerge more obviously from the detailed description that follows, illustrated by way of an example on the accompanying drawings, in which.

DESCRIPTION OF THE PREFERRED EMBODIMENT

Figure 2:
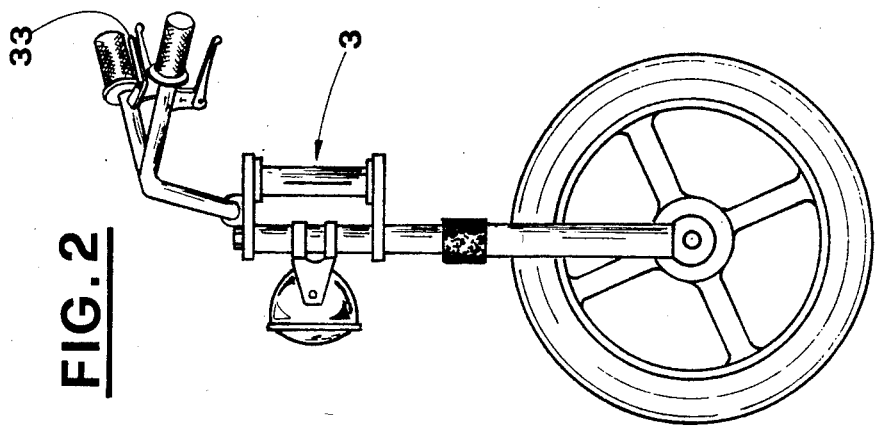
FIG. 2 shows the steering and control assembly of the motorbike detached from the part illustrated in FIG. 1.

With reference to the accompanying drawings, the light motorbike forming the subject of the invention comprises a frame 1 in the form of an inverted "L", the inside of which is used as a tank. At the front, the said frame 1 is provided with a tubular part 2 and this can be opened vertically in such a way as to permit the steering and control assembly 3 to be separated completely from the remainder of the motorbike. Naturally, the opening and closing of the tubular part 2 can be effected with the use of means that are known and are easy for the user to operate, such as, for example, a knob, shown at 2a, or releasing lever, etcetera. In this way, compared with motorbikes that only fold, the placing of the vehicle inside the camper, caravan or boat is rendered even easier. The separation of the two parts of the motorbike can, furthermore, be effected without any difficulty since the mechanical transmission and electrical cables belonging to the steering and control assembly 3 are all equipped with quick fastening/release coupling or connections.

In particular, the fuel line can easily be separated from the steering and control assembly 3 together with the hand control 33. The latter is also of a special design: it is, in fact, provided with a clutch and so, therefore, does not spring back automatically, this being a necessary requirement for the engine to power auxiliary groups.

The construction of the back part of the motorbike has been effected using extremely cheap and simple methods, yet maintaing for it the most complete functional ability.

The motorbike comprises, in fact, a metal rigid casing 4 in which all the transmission elements 5 are housed. Through a pin 6, the two parts are supported by the rod of the frame 1. In particular, the casing 4 carries, cantilevered thereto on one side, an engine 7 and contains, centrally at a point corresponding to where the pin 6 is located, reduction means 8 where the power takeoff 9 is positioned. The task of the reduction means is to furnish the power takeoff with the optimal number of revolutions with which to run any external group that may be connected to the power takeoff 9 through a flexible transmission cable 17.

On the opposite side to the engine 7, with respect to the pin 6, the said casing 4 is provided with a coupling pin 10 for the rear driving wheel 11. The latter is cantilevered to the casing 4 and is fastened to the frame 1 through one single shock absorber 12, one extremity of which is pivotally connected, at 13, to the frame 1, and the other, at 14, to the casing 4.

Figure 1:
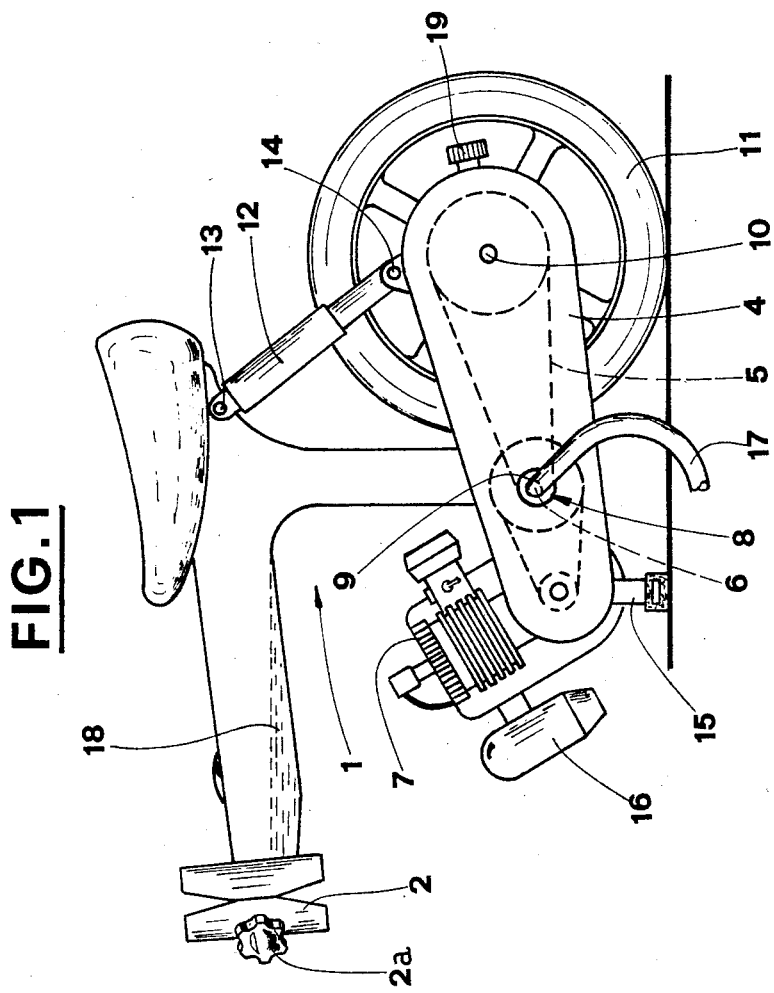
FIG. 1 shows, in a lateral view, the back part of the light motorbike forming the subject of the invention, at the time it is being used purely to power auxiliary devices.

The light motorbike in question is also provided with a pair of extractable foot rests 15 that are placed at the bottom of the casing 4 and are integral therewith. As clearly shown in FIG. 1, the foot rests 15 also constitute means for resting on the ground the casing 4 and the complete back part of the motorbike at the time this is detached from the steering and control assembly 3. It is important to stress that, in this case, the inclination of the upper part of the frame 1, with respect to the horizontal, is such as to form a negative acute angle. Because of the particular position adopted, the motorbike is provided with a fuel reserve 18 localized in the front sloping part of the said frame 1. Therefore, when the engine 7 is being used as a source of mechanical power, the user has available a good reserve quantity of fuel.

The particular way in which the motorbike in question has been constructed and the need that has to be satisfied for it to be of a minimum volume, have made it necessary for the muffler 16 to be mounted at the front of the engine 7.

Note should also be taken of the fact that the motorbike has on it a knob 19 for the eccentric disengagement of the driving wheel 11 from the transmission elements 5.

To conclude, it should be stated that the engine 7 is provided with forced air cooling so that it can also operate at a standstill.

What is claimed is:

1. Light motorbike with takeoff for powering separate devices, comprising:

an inverted "L" shaped frame, a portion of which is used as a tank and having a front tubular part adapted to be connected to a steering and control assembly, whereby said assembly can be readily disconnected from the remainder of the motorbike, all the mechanical transmission and electrical cables belonging to the steering and control assembly being equipped with quick fastening/release couplings;

a rigid casing containing a transmission and supported by a pin from a rod of the frame, said casing carrying, cantilevered thereto on one end, an engine and containing, centrally at a point corresponding to where said pin is located, reduction means, a power takeoff connectable to said reduction means, while on the opposite end of the casing, the casing is provided with a coupling pin for securing a rear driving wheel, the connection between the frame and the rear wheel being effected through a single shock absorber, one extremity of which is fastened to the frame, and the other to the casing;

a pair of extractable foot rests that are secured to a bottom of the casing and integral therewith, said foot rests adapted for resting the casing on the ground at the time the steering and control assembly has been removed, defining an inclination of the upper part of the frame, with respect to the horizontal, at a negative acute angle; and means for disconnecting said rear wheel from the reduction means when said power takeoff is being used.

2. Light motorbike according to claim 1, wherein a muffler is mounted at the front of the engine.

* * * * *